Nov. 7, 1961 W. P. DE KOKER ET AL 3,008,007

RECEIVER FOR USE IN FREQUENCY SHIFT TELEGRAPHY

Filed Sept. 16, 1957

INVENTORS
WILLY PETRUS DE KOKER
STEPHANE JEAN GUSTAVE VLEMINCK

BY Frank R. Trifari
AGENT

United States Patent Office 3,008,007

Patented Nov. 7, 1961

3,008,007
RECEIVER FOR USE IN FREQUENCY SHIFT TELEGRAPHY

Willy Petrus De Koker, and Stephane Jean Gustave De Vleminck, both of Brussels, Belgium, assignors to North American Philips Company, Inc., New York, N.Y., a corporation of Delaware Filed Sept. 16, 1957, Ser. No. 684,203
Claims priority, application Netherlands Sept. 27, 1956
6 Claims. (Cl. 178—88)

This invention relates to a receiver for use in frequency-shift telegraphy in which the demodulated mark signals derived from a frequency detector are supplied to a pulse regenerator through a direct-voltage restorer. A frequency-shift telegraphy receiver of this kind has the advantage that distortions in the mark signals reproduced by the pulse regenerator owing to variations of the direct-voltage level of the demodulated mark signals, which variations may be due to variations in the transmitter frequency or the receiver tuning, are reduced.

It is an object of the present invention to provide a receiver of the kind described in which the said distortions are reduced to a minimum or even substantially avoided by simple means.

According to the invention, a frequency-shift telegraphy receiver is characterized in that the direct-voltage restorer comprises two parallel-connected branches which each contain the series combination of a capacitor and a diode, one of the input terminals being connected to the series capacitors and the other input terminal being connected to unlike electrodes of the diodes, a bias voltage supply source, which cuts off these diodes and is independent of the incoming demodulated mark signals, being connected between the electrodes remote from the last-mentioned input terminal, one of the output terminals being connected to this bias supply while the other output terminal is connected to the junction of the diodes.

According to a further feature of the invention, in order further to improve the mark signal reproduction each junction of a capacitor and a diode in the parallel-connected branches of the direct-voltage restorer is connected through a resistor to a correcting circuit which is fed with demodulated mark signals which are in phase with the mark signals in the direct-voltage restorer but have an increased amplitude.

Figure 1:
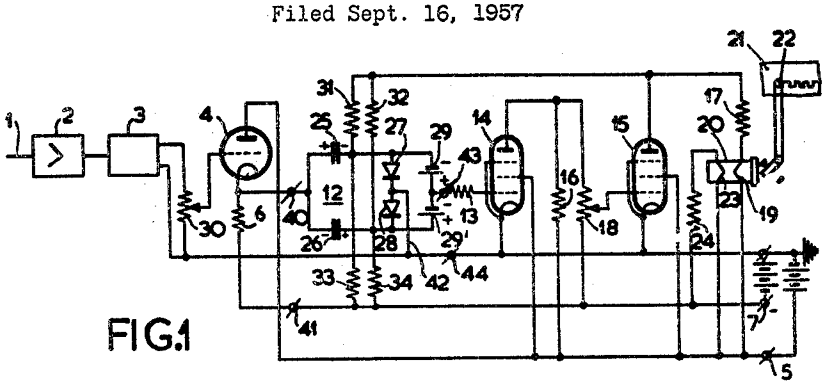
Figure 2:
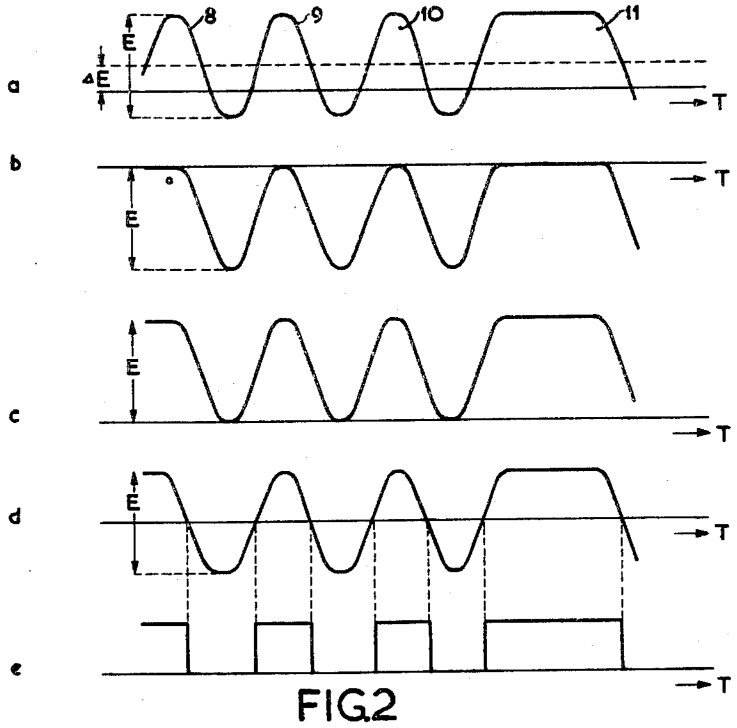
Figure 3:
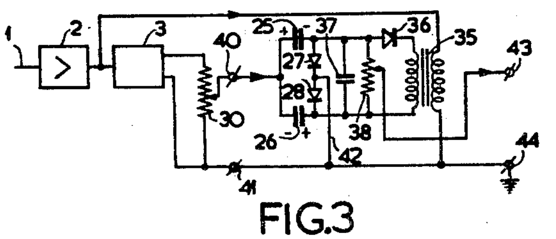

In order that the invention may readily be carried into effect two embodiments thereof will now be described, by way of example, with reference to the accompanying diagrammatic drawings in which:

FIG. 1 shows a frequency-shift telegraphy receiver in accordance with the invention, FIG. 2 shows some voltage wave forms illustrating the operation of the receiver shown in FIG. 1, and FIG. 3 shows a modified embodiment of the direct-voltage restorer shown in FIG. 1.

The frequency-shift telegraphy receiver shown in FIG. 11 is adapted to carrier telegraphy, the bandwidth available in each channel being 120 c./s. and the frequency shift between the work and rest frequencies being 2×35 c./s. The oscillations which are received through a conductor 1 and vary in frequency in accordance with the mark signal modulations, are supplied, after amplification in an AVC-controlled amplifier 2, to a frequency detector 3 of the band-pass filter type, which delivers either a positive or a negative direct voltage according to whether the work frequency or the rest frequency is received. The resulting demodulated mark signals control a cathode follower comprising a triode 4, the anode of which is connected to a positive terminal 5 and the cathode of which is connected, through a cathode resistor 6, to the negative terminal 7 of a voltage supply battery.

In the voltage wave form of FIGURE 2*a*, the curve *a* represents the signals which at the beginning of a telegraphic message are derived from the frequency detector during a given period of time and may comprise four mark signals 8, 9, 10 and 11. As is shown in the figure, the direct-voltage level of the mark signals is shifted through a distance $+\Delta E$.

In order to avoid distortion of the reproduction of the mark signals shown owing to variations in the direct-voltage level of the signals derived from the cathode follower 4, the output voltage of the cathode follower 4 is supplied to a direct-voltage restorer 12, which is described more fully hereinafter. To the output circuit of the direct-voltage restorer 12 there is connected, through a series resistor 13, a pulse regenerator comprising the cascade arrangement of two pentodes 14, 15 which not only amplify but also limit the mark signals. The anodes of the pentodes 14, 15 are each connected, through resistors 16 and 17 respectively, to the positive terminal 5 of the voltage supply battery, the cathodes being connected to earth, while the output voltage of the pentode 14 is supplied, through a voltage divider 18 connected to the negative terminal 7, to the control grid of the pentode 15.

In the anode circuit of the pentode 15 there is connected in series with the resistor 17 an energizing winding 19 of a polarized relay 20 which is also provided with a second energizing winding 23 which, in series with an adjusting resistor 24, is connected to the terminal 5, 7 of the voltage supply battery.

The polarized relay 20 each time responds at one half of the peak-to-peak value of the mark signals supplied to the input of the pulse regenerator 14, 15, which are corrected in direct-voltage level, and, as is shown diagrammatically in the figure, controls a writing device 22 arranged on a moving recording tape 21 to reproduce the received mark signals.

According to the invention, the direct-voltage restorer 12 comprises two parallel-connected branches each containing the series combination of a capacitor 25 and 26 and a diode 27 and 28, respectively, one of the input terminals 40 being connected to the series capacitors 25, 26 while the other input terminal 41 is connected, through terminal 7, earth and lead 42, to unlike electrodes of the diodes 27, 28. Between the electrodes of the diodes 27, 28 more remote from the input terminal 41 there is connected a bias supply 29, 29′ in the form of a battery, which cuts off these diodes 27, 28 and is independent of the incoming demodulated mark signals, one output terminal 43 being connected to a center tap of this bias supply 29, 29′ and the other output terminal 44 being connected to the junction of the diodes 27, 28. By means of an adjustable voltage divider 30 connected in the output circuit of the frequency detector 3, the amplitude of the mark signals supplied to the input of the direct-voltage restorer 12 is adjusted so that the peak-to-peak value of the mark signals is equal to the voltage E of the bias supply 29, 29′ which bridges the rectifiers 27, 28. In order to minimize the distortion it is important that the peak-to-peak value of the demodulated mark signals supplied to the input of the direct-voltage restorer 12 should be substantially constant and substantially equal to the voltage E of the bias supply 29, 29′.

When the telegraphy signal shown in FIG. 2a is supplied to the input terminals 40, 41 of the direct-voltage restorer 12, at the first mark signal 8 the diode 27 becomes conducting. As a result, through the low output impedance of the cathode follower 4 the capacitor 25 is rapidly charged with negative polarity to the peak value of the first mark signal 8, this peak value being equal to the sum of one half of the peak-to-peak value E of the demodulated mark signals and of the shift ΔE of the direct-voltage level. Thus, a voltage $-\frac{1}{2}E-\Delta E$ is set up at the capacitor 25.

The voltage of the capacitor 26 is always equal to the algebraic sum of the voltage of the capacitor 25 and the battery voltage E, so that the capacitor 26 is charged to a voltage $$-\tfrac{1}{2}E-\Delta E+E=+\tfrac{1}{2}E-\Delta E$$

When the signal shown in FIG. 2*a* is received, the voltage at the electrode of capacitor 25 more remote from the cathode follower varies in the manner shown in FIG. 2*b*, FIG. 2*c* representing the voltage at the electrode of the capacitor 26 more remote from the cathode follower. Each time the peak values of the voltages shown in FIGS. 2*b* and 2*c* attain earth potential, the diodes 27 and 28 respectively become conductive for a short period of time. The voltages at the capacitors 25 and 26 are compared wtih the peak values of the demodulated mark signals and, if required, charged to the instantaneous peak values.

The output voltage of the direct-voltage restorer 12, which is taken from output terminals 43 connected to the center tapping of the battery 29, 29' and 44, is given by the algebraic sum of the voltage shown in FIG. 2*b* or FIG. 2*c* and the battery voltage between the capacitors 25 or 26 and the center tap on the battery 29, 29'. The variation of the output voltage is shown in FIG. 2*d*, from which it will be seen that the mark signals taken from the output circuit of the direct-voltage restorer 12 are completely corrected with respect to the direct voltage shift ΔE.

FIG. 2*e* shows the wave form of the mark signals recorded by the polarized relay 20 on the recording tape 21. Mark signal distortion due to variations of the direct-voltage level are reduced to a minimum by the direct-voltage restorer described.

It was found that under certain circumstances, that is to say, after a prolonged signalling interval, a certain distortion of the mark signals can occur, specifically of the next subsequent mark signal, and it was further found that this distortion is due to the occurrence of small leakage currents, more particularly the grid current of the tube 14. If during this interval the work signal is received which corresponds to a positive input signal of the direct-voltage restorer 12, the positively charged capacitor 26 is discharged by the grid current of the tube 14 through the series resistor 13. The positive voltage of the capacitor 26 is gradually decreased, the negative voltage of the capacitor 25 is correspondingly increased and the diode 27, which at this instant is conducting, is cut off, so that after the signalling interval the capacitor voltages deviate from the value required for correct mark signal transmission and due to this variation of the capacitor voltages the next subsequent mark signal is distorted.

In order to avoid the said distortion of the mark signals owing to leakage currents occurring during the signalling intervals, the junctions of the diodes 27, 28 and the capacitors 25, 26 are connected, through resistors 31, 32, to a corrector circuit connected to the pulse regenerator 14, 15 this corrector circuit being fed with regenerated mark signals which, as compared with the mark signals in the direct-voltage restorer 12, are equal in phase but increased in amplitude. Hence, in the embodiment shown the corrector circuit is connected to the anode circuit of the tube 15 of the pulse regenerator 14, 15, the junctions of the resistors 31, 32 and the capacitors 25, 26 being connected to the negative terminal 7 of the voltage supply battery through resistors 33, 34.

If, in the arrangement shown, the work frequency occurs during a prolonged signalling interval, which corresponds to a positive input voltage of the direct-voltage restorer 12, the grid current of the tube 14 is supplied by the corrector circuit so that the voltage of the capacitor 26 cannot be decreased. The voltage of the capacitor 26 is accurately maintained at its initial value, since the electrode of the capacitor 25 more remote from the cathode follower is maintained at earth potential by the diode 27 which now is conductive. During a signalling interval in which the rest frequency is received, which corresponds to a negative input voltage of the direct-voltage restorer 12, the capacitor voltages are prevented from flowing away in the same manner.

The electrical values of the corrector circuit are not critical, provided that it is ensured that the corrector circuit can supply a current exceeding the leakage currents in the direct-voltage restorer 12 and the resistors 31, 32, 33 and 34 of the corrector circuit are made sufficiently large to prevent them from influencing the normal operation of the direct-voltage restorer.

When the amplitude of the demodulated mark signals appearing at the output of the frequency detector 3 exceeds the amplitude of the mark signals in the direct-voltage restorer, the corrector circuit may also be fed with demodulated mark signals taken from the frequency detector.

In a circuit arrangement which was extensively tested in practice, use was made of components of the following types and values

| | |
|---|---|
| Triode 4 | ECC 82. |
| Pentodes 14, 15 | E 83 F. |
| Diodes 27, 28 | OA 85. |
| Capacitors 25, 26 | 20 μf. |
| Resistors 31, 32 | 270 kΩ. |
| Resistors 33, 34 | 470 kΩ. |
| Series resistor 13 | 1 MΩ. |
| Voltage of supply terminal 5 | +120 v. |
| Voltage of supply terminal 7 | −120 v. |
| Battery 29, 29' | 20 v. |

At the work frequency, the voltages at the input of the direct-voltage restorer 12 and at the anode of the tube 15 are about +10 v. and +120 v. respectively, while at the rest frequency they are about −10 v. and +20 v. respectively.

FIG. 3 shows a modified embodiment of the direct-voltage restorer shown in FIG. 1. Corresponding elements are designated by like reference numerals.

In this arrangement, there are supplied to the input terminals 40, 41 of the direct-voltage restorer 12 the demodulated mark signals which are taken directly from the adjusttable voltage divider 30 which is connected in the output circuit of the frequency detector 3. The direct-voltage restorer of FIG. 3 is distinguished from that shown in FIG. 1 in that the bias voltage for the diodes 27, 28 of the direct-voltage restorer is not produced by means of a battery but by rectification of the output voltage of the amplifier 2 for the incoming frequency-demodulated oscillations. To this end, the output voltage of the amplifier 2 is supplied, through a transformer 35, to a rectifying circuit comprising a rectifier 36, a capacitor 37 and an output resistor 38, this output resistor 38 being connected between the electrodes of the diodes 27, 28 more remote from the input terminal 41. The output voltage of the direct-voltage restorer 12 is taken from output terminals 43, 44 which are connected to a center tapping on the resistor 38 and to earth, respectively.

In order to ensure that, when a corrector circuit is used, the direct voltage obtained by rectification is not influenced by currents of the corrector circuit, the detection current through the resistor 38 is made appreciably larger than the currents of the corrector circuit by the use of suitable values of the components 35, 36, 37, 38 of the rectifying circuit.

It should be noted that it is not absolutely necessary to connect an output terminal of the direct-voltage restorer 12 to a center tap on the bias supply. When this terminal is not connected to the center tapping, the mark signals derived from the direct-voltage restorer contain a constant direct-voltage component but this does not interfere with satisfactory operation.

What is claimed is:

1. A receiver for telegraph signals, comprising a detector connected to detect said signals, and a direct-voltage restorer circuit comprising an input terminal connected to the output of said detector, a common terminal, a first series circuit comprising a first capacitor and a first diode connected in series between said input terminal and said common terminal, a second series circuit comprising a second capacitor and a second diode connected in series between said input terminal and said common terminal, said first and second capacitors each having an electrode connected to said input terminal and said first and second diodes having unlike electrodes connected to said common terminal, a source of constant bias voltage independent of signals applied to said input terminal connected between the junction of said first capacitor and said first diode and the junction of said second capacitor and said second diode and having a polarity to render said first and second diodes normally in a non-conductive condition, and an output terminal connected to a point on said source of bias voltage, the valve of said bias voltage being substantially equal to the peak-to-peak value of said telegraph signals.

2. A receiver as claimed in claim 1, in which said output terminal is connected to the center point of said source of bias voltage.

3. A receiver as claimed in claim 1, including a variable voltage divider interposed between said detector and said direct-voltage restorer.

4. The receiver of claim 1 comprising a corrector circuit connected to the junction of said first capacitor and said first diode and to the junction of said second capacitor and said second diode, pulse regenerator means connected to said output terminal, and means applying the output of said pulse regenerator means to said corrector circuit, whereby said corrector circuit supplies compensating pulses in phase with the signals applied to said input terminal.

5. A receiver as claimed in claim 1, in which said source of bias voltage comprises a transformer having a primary connected to receive said telegraph signals and having a secondary, and means connected to rectify the output voltage of said secondary.

6. A receiver for telegraph signals, comprising a detector connected to detect said signals, and a direct-voltage restorer circuit comprising an input terminal connected to the output of said detector, a common terminal, a first series circuit comprising a first capacitor and a first diode connected in series between said input terminal and said common terminal, a second series circuit comprising a second capacitor and a second diode connected in series between said input terminal and said common terminal, said first and second capacitors each having an electrode connected to said input terminal and said first and second diodes having unlike electrodes connected to said common terminal, a source of bias voltage connected between the junction of said first capacitor and said first diode and the junction of said second capacitor and said second diode and having a polarity to render said first and second diodes normally in a non-conductive condition, an output terminal connected to a point on said source of bias voltage, a regenerative pulse repeater having an input circuit connected to said output terminal, a first resistive means connected between the output of said regenerative pulse repeater and the junction of said first capacitor and said first diode, and a second resistive means connected between the output of said regenerative pulse repeater and the junction of said second capacitor and said second diode.

References Cited in the file of this patent

UNITED STATES PATENTS

| | | |
|---|---|---|
| 2,157,170 | Grundman et al. | May 9, 1939 |
| 2,525,106 | Wendt | Oct. 10, 1950 |
| 2,564,017 | Maggio | Aug. 14, 1951 |
| 2,630,486 | Rieke | Mar. 3, 1953 |
| 2,636,080 | Doba | Apr. 21, 1953 |
| 2,662,114 | Beard | Dec. 8, 1953 |
| 2,792,496 | Rhodes | May 14, 1957 |
| 2,802,102 | Imm | Aug. 6, 1957 |
| 2,805,281 | Bouwman et al. | Sept. 3, 1957 |
| 2,859,344 | Imm | Nov. 4, 1958 |
| 2,861,185 | Hopper | Nov. 18, 1958 |

FOREIGN PATENTS

| | | |
|---|---|---|
| 524,312 | Belgium | May 17, 1954 |

UNITED STATES PATENT OFFICE

CERTIFICATION OF CORRECTION

Patent No. 3,008,016 November 7, 1961

Carl E. Mercier

It is hereby certified that error appears in the above numbered patent requiring correction and that the said Letters Patent should read as corrected below.

Column 7, line 10, for "relieved" read -- relieve --; line 26, for "haivng" read -- having --; line 40, after "positions" insert -- having a housing --; column 8, line 6, after "disconnect" insert -- contacts --.

Signed and sealed this 10th day of April 1962.

(SEAL)
Attest:

ERNEST W. SWIDER
Attesting Officer

DAVID L. LADD
Commissioner of Patents